(12) United States Patent
Lepage

(10) Patent No.: US 11,813,745 B2
(45) Date of Patent: Nov. 14, 2023

(54) MOBILE ROBOT FOR INSPECTING A TURBOMACHINE

(71) Applicant: SAFRAN AIRCRAFT ENGINES, Paris (FR)

(72) Inventor: Thomas Jean Michel Lepage, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 392 days.

(21) Appl. No.: 16/973,336

(22) PCT Filed: Jun. 7, 2019

(86) PCT No.: PCT/FR2019/051391
§ 371 (c)(1),
(2) Date: Dec. 8, 2020

(87) PCT Pub. No.: WO2019/239046
PCT Pub. Date: Dec. 19, 2019

(65) Prior Publication Data
US 2021/0245362 A1    Aug. 12, 2021

(30) Foreign Application Priority Data

Jun. 12, 2018 (FR) ...................... 1855127

(51) Int. Cl.
*G01M 15/14* (2006.01)
*B25J 9/06* (2006.01)
(Continued)

(52) U.S. Cl.
CPC ................. *B25J 9/06* (2013.01); *B25J 5/007* (2013.01); *B25J 13/08* (2013.01); *G01M 15/14* (2013.01)

(58) Field of Classification Search
CPC .. B25J 5/007; B25J 9/06; B25J 13/08; G01M 15/14
See application file for complete search history.

(56) References Cited

U.S. PATENT DOCUMENTS 5,337,732 A * 8/1994 Grundfest .............. A61B 34/30
600/116
5,662,587 A * 9/1997 Grundfest ............ A61B 1/0051
600/116

(Continued)

FOREIGN PATENT DOCUMENTS

CN          106272542 A      1/2017
WO     WO 2012/042921 A1    4/2012

OTHER PUBLICATIONS

Search Report dated Nov. 26, 2019, in FR Application No. 1855127 (2 pages).

(Continued)

*Primary Examiner* — Eric S. McCall
(74) *Attorney, Agent, or Firm* — Bookoff McAndrews, PLLC

(57) ABSTRACT

Mobile robot for inspecting a turbomachine comprising at least a measuring device and a body including an assembly of at least three rigid segments each having two opposite longitudinal ends, the longitudinal ends of each segment being equipped with a hinge including a ball joint, each ball joint comprising a motorized wheel mounted therearound, the measuring device being mounted on a ball joint located at one end of the body.

11 Claims, 2 Drawing Sheets

(51) Int. Cl.
  *B25J 5/00* (2006.01)
  *B25J 13/08* (2006.01)

(56) References Cited

U.S. PATENT DOCUMENTS

| | | | |
|---|---|---|---|
| 9,086,386 B1* | 7/2015 | Rutherford | G01N 27/902 |
| 2005/0166413 A1* | 8/2005 | Crampton | G01B 5/008 |
| | | | 33/503 |
| 2009/0302517 A1* | 12/2009 | Patel | B25B 1/2484 |
| | | | 269/71 |
| 2010/0199766 A1* | 8/2010 | Bossi | G01N 29/28 |
| | | | 73/584 |
| 2012/0268151 A1* | 10/2012 | Zai | G01R 31/2887 |
| | | | 324/750.16 |
| 2014/0205403 A1* | 7/2014 | Criswell | B25J 15/0028 |
| | | | 414/809 |
| 2015/0107485 A1 | 4/2015 | Hirose et al. | |
| 2015/0367509 A1* | 12/2015 | Georgeson | B64F 5/60 |
| | | | 901/44 |
| 2015/0375276 A1 | 12/2015 | Sivacoe | |
| 2017/0052216 A1* | 2/2017 | Campbell | G01R 1/06705 |
| 2021/0065370 A1* | 3/2021 | Kotoku | G06V 10/764 |
| 2021/0290323 A1* | 9/2021 | Sachs | B25J 9/108 |
| 2021/0347038 A1* | 11/2021 | Zhang | B25J 13/085 |

OTHER PUBLICATIONS

International Search Report issued in International Application No. PCT/FR2019/051391 dated Nov. 20, 2019 (2 pages).
Edwin Dertien et al., "Development on an inspection robot for small diameter gas distribution mains," Robotics and Automation (ICRA), 2011 IEEE International Conference On, IEEE, May 9, 2011, DOI: 10.1109/ICRA.2011.5980077, ISBN: 978-1-61284-386-5. XP 032033900 figures 1-16 (pp. 5044-5049).

* cited by examiner

MOBILE ROBOT FOR INSPECTING A TURBOMACHINE

CROSS-REFERENCE TO RELATED APPLICATION(S)

This application is the U.S. national phase entry under 35 U.S.C. § 371 of International Application No. PCT/FR2019/051391, filed on Jun. 7, 2019, which claims priority to French Patent Application No. 1855127, filed on Jun. 12, 2018.

BACKGROUND OF THE INVENTION

The invention lies within the field of techniques for inspecting mechanical parts, in particular engine parts, for example vanes of an aircraft turbomachine. More specifically, the invention relates to a robotic tool for assisting the internal endoscopy of turbomachines.

Many engine parts are critical, their fracture may have serious impacts on the entire system, for example on the aircraft. In order to deal with these risks, many endoscopic operations are carried out in aircraft turbines during test or maintenance phases. These inspection operations can represent in practice up to about 20% of the total time of the phases of some tests.

The current endoscopic tools commonly consist of an optical probe which is placed at the end of a rigid or semi-flexible rod and which returns live image pickups on a monitor screen. In the example of a turbomachine, the rod is manipulated by an operator allowing him to access the inner areas of the engine via endoscopic holes arranged along the turbomachine. He then uses the image available on the screen to locate himself in space and guide the endoscope.

During inspection operations, the operator may nevertheless be confronted with several difficulties. Indeed, modern engines are more difficult to access and their increasingly compact integration makes the endoscopic holes difficult to access for the operator, who must then handle his tools in poorly ergonomic postures.

Given the compactness of these engines, the inner areas of a turbomachine to be inspected have increasingly complex access paths. For example, gas generators are more and more compact and new areas to be inspected such as turbine rectifiers require a very great length of endoscopic rod. This length of cable to be inserted into endoscopic holes commonly represents half of the perimeter of the turbomachine stage to be inspected, and involves slow and complex guidance of the cable by the operator, the latter being led to progress between various obstacles given the narrowness of the spacings between the parts of the turbomachine.

Another type of inspection tool commonly used is in the form of a snake-like robot, which is also inserted into an endoscopic hole. The robotic snake is made up of successive segments hinged in a cantilevered manner that allow the robot to move in the turbomachine. However, this type of solution also turns out to be limited in terms of design. Once again, given the complexity of the access paths and the distances to be covered in the turbomachine, it is necessary to produce a tool with a significant length. The increase in the length of this tool leads to an increase in its mass, requiring the addition of structural reinforcements impacting once again the mass of the robot. Such a solution therefore turns out to be particularly complex to implement in terms of mass/length compromise, commonly involves a large total mass and is complex to be handled by the operator.

Moreover, the drastic aircraft availability requirements make the diagnostic errors during endoscopic inspections very costly. The lack of repeatability of the current measurement tools, which are very dependent on the operator, increases the risk of incorrect diagnosis of the turbomachines and limits the possibilities of feedback, and therefore of continuous improvement. Recent years have in particular seen the emergence of smart diagnostic tools to evaluate the health condition of engines. These tools use statistical and physical models that require a large amount of data to predict the health condition of the engines. The endoscopic data therefore represent significant potential for these diagnostic tools. However, since current inspection tools are dependent on the handling of the operator, the diagnostic data lack repeatability and are hardly reusable. In this context, it would be desirable for the equipment manufacturers to obtain repeatable and exploitable diagnostic data in order to improve the quality of diagnoses and provide interoperable data with the current diagnostic models.

OBJECT AND SUMMARY OF THE INVENTION

The aim of the present invention is to overcome the aforementioned drawbacks.

To this end, the invention proposes a mobile robot for inspecting a turbomachine comprising at least a measuring device and a body including an assembly of at least three rigid segments each having two longitudinal ends, the longitudinal ends of each segment being equipped with a hinge including a ball joint, each ball joint comprising a motorized wheel mounted therearound, the measuring device being mounted on a ball joint located at a longitudinal end of the body.

Advantageously, the mobile robot described above has miniaturized dimensions and a low mass. It can thus be easily inserted into endoscopic holes of an engine, move between two blades of a rotor or stator stage of a turbomachine via its motorized wheels, move from one stage to another, acquire and transmit measurements and/or image pickups inside the turbomachine via the measuring device (s). In practice, the inspection tools of the state of the art are difficult to insert into narrow spacings, often have to bypass them and avoid bumping into walls. Conversely, the mobile robot proposed here takes advantage of narrow spaces between two surfaces to move by adhesion via its motorized wheels. This mobile robot also allows obtaining measurements that are easily repeatable by the operator, who can during future inspections position the robot under the same conditions as during previous inspections. The data obtained are therefore highly reusable, in particular in the use of statistical models for the diagnosis of the engines. The robot described above therefore provides complementarity and interoperability with respect to existing diagnostic tools.

In one exemplary embodiment, the longitudinal ends of each segment have a bevel-shaped profile.

In one exemplary embodiment, the mobile inspection robot further comprises a system for tensioning the ball joints, configured to move the segments and said at least one probe device between a first configuration in which the segments and the measuring device are aligned and a second configuration in which each segment has with said at least one adjacent segment or with said at least one measuring device an angle of less than 180°.

In one exemplary embodiment, said at least one measuring device comprises at least a camera, a laser probe and/or an ultrasound probe.

In one exemplary embodiment, the mobile inspection robot comprises two measuring devices each located at an opposite longitudinal end of the body.

In one exemplary embodiment, the motorized wheels are universal wheels or Mecanum wheels.

In one exemplary embodiment, said at least one measuring device has dimensions smaller than the length of each segment.

The invention also proposes an inspection system comprising an inspection robot as described above, the system further comprising a monitoring unit comprising a control module configured to control the movement and the hinge of the mobile robot according to the three spatial dimensions and a receiving module configured to receive measurements obtained from said at least one measuring device.

In one exemplary embodiment, the inspection system comprises:
- a wired connection interconnecting the mobile robot and the monitoring unit, the wired connection being configured to convey a control signal of the mobile robot coming from the control module to the mobile robot and to convey a measurement signal from said at least one measuring device to the receiving module, and
- an unwinder with slack management configured to unwind the wired connection according to a control signal of the monitoring unit.

The invention also proposes a method for inspecting a turbomachine implementing the inspection system summarized above, the method comprising the following steps:
- a step of inserting the mobile robot into an endoscopic hole arranged in the turbomachine;
- a step of positioning the mobile robot between two blades of a rotor or stator stage of the turbomachine;
- a step of tensioning the mobile robot;
- a step of rotating the rotors of the turbomachine;
- a step of inspecting, by said at least one measuring device, the blades facing the mobile robot during the rotating step.

BRIEF DESCRIPTION OF THE DRAWINGS

Other characteristics and advantages of the invention will emerge from the following description of particular embodiments of the invention, given by way of non-limiting examples, with reference to the appended drawings, in which.

DETAILED DESCRIPTION OF EMBODIMENTS

Figure 1:
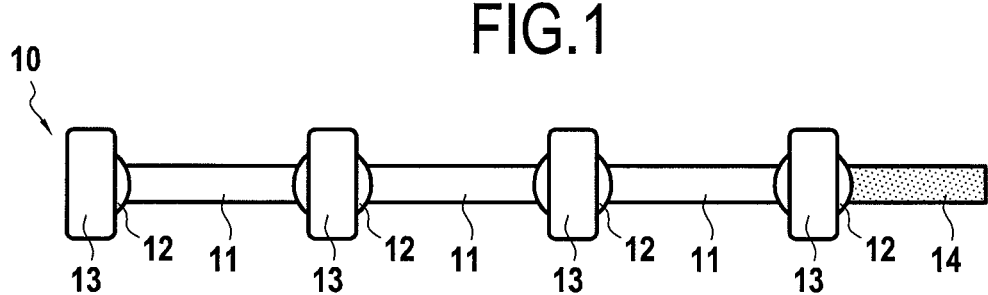
FIG. 1 schematically illustrates a side view of a mobile robot in a first configuration according to one embodiment.
Figure 2:
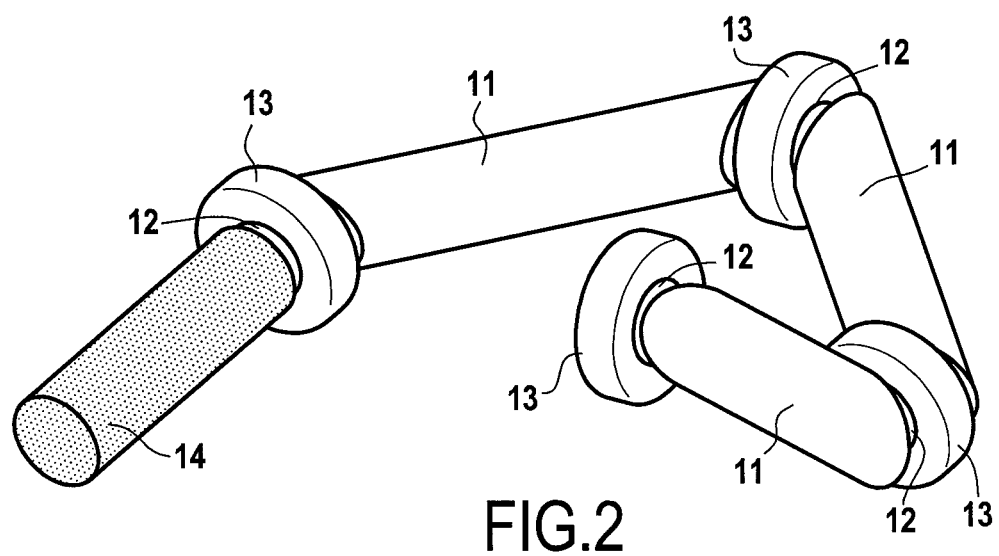
FIG. 2 illustrates a perspective view of the mobile robot of FIG. 1 in a second configuration according to one embodiment.

FIGS. 1 and 2 illustrate according to one embodiment a mobile robot 10 respectively in a first and a second configuration.

As will be seen below, the mobile robot 10 is in particular intended for the inspection of the parts of a turbomachine, for example the inspection of the blades of a high-pressure or low-pressure turbine in an aircraft turbomachine. However, it is understood that the mobile robot 10 which will be described can be used within the framework of other applications, for example to inspect engine parts including holes, or even inner surfaces of a duct.

The mobile robot 10 comprises a body including an assembly of at least three rigid segments 11. The rigid segments 11 may be hollow and have a cylindrical or frustoconical shape. In the example illustrated in FIG. 2, each rigid segment 11 is a cylinder of revolution, however any other shape of a straight cylinder, or any other frustoconical shape, could be envisaged. Each segment length 11 of the mobile robot is chosen in line with the environment to be inspected. By way of example, for the inspection of a turbine stage, each segment length 11 is chosen in line with the dimensions of the blades of this turbine stage. Typically, the length of each segment 11 is less than 1 cm. Each rigid segment 11 includes two opposite longitudinal ends, each longitudinal end of each rigid segment 11 being equipped with a hinge which includes a hinged ball joint 12. A motorized wheel 13 is mounted around each hinged ball joint 12. In the embodiments illustrated in FIGS. 1 and 2, the motorized wheels 13 are produced in the form of universal wheels allowing the mobile robot 10 to move according to the three spatial dimensions. However, in order to facilitate the movements of the mobile robot 10, other types of wheels known to those skilled in the art can be envisaged, for example Mecanum wheels or holonomic wheels. These types of wheels have indeed the advantage of proposing a movement according to all the spatial dimensions without requiring complex maneuvers, thus facilitating the driving of the mobile robot 10 by an operator.

At least one measuring device 14 is also associated with a free longitudinal end of one of the rigid segments 11 of the mobile robot 10. Thus, in FIGS. 1 and 2, a measuring device 14 is associated with a ball joint 12 of one of the rigid segments 11. More specifically, the measuring device 14 is mounted on a ball joint 12 located at one of the longitudinal ends of the body of the mobile robot 10. In another embodiment (not illustrated), a second measuring device 14 can be associated with another free longitudinal end of one of the rigid segments 11. In other words, two measuring devices 14 are then separated by the body of the mobile robot 10, extend in the extension of the latter and are each located at one of its longitudinal ends. Each measuring device 14 can comprise one or more measurement tool(s), for example a camera, a laser probe, an infrared probe, an ultrasound probe, and/or more generally any type of non-destructive monitoring means. In order to facilitate the movement of the mobile robot 10, each measuring device 14 is also produced so as to have dimensions smaller than the length of each rigid segment 11 of the mobile robot 10.

In FIG. 1, the mobile robot 10 is in a first rectilinear and "unhinged" configuration: in this configuration, the ball joints 12 are not tensioned, the rigid segments 11 and the measuring device 14 are then aligned. This configuration can advantageously be used in order to allow the insertion of the mobile robot 10 into an endoscopic hole. An endoscopic hole having in practice a diameter less than 1 cm, the respective diameters of the measuring device 14 as well as of the rigid segments 11 are dimensioned to be less than 1 cm. FIG. 2 illustrates a second "hinged" configuration of the mobile robot 10. In this second configuration, the ball joints 12 are tensioned via an elastic restoring force such that each rigid segment 11 has with at least one adjacent segment or with the measuring device 14, an angle of less than 180°.

The configurations of the mobile robot 10 can be controlled by a tensioning system 16, configured to authorize or not the tensioning of the ball joints 12 and therefore to control the movement of each rigid segment 11. The tensioning of the ball joints 12 can for example be achieved by winding an elastic cable, or by the use of a shape memory spring.

In the example illustrated in FIG. 2, in order to allow movement of the rigid segments 11 when the ball joints 12 are tensioned, each longitudinal end of each rigid segment 11 has a bevel shape. The use of hollow cylinders to form each rigid segment 11 allows for its part the integration into these segments of power supply and control means (e.g.: via one or several wired connections) for the motorized wheels 13 and for the measuring device 14, and possibly the integration of means for conveying the signals of measurement made by each measuring device 14.

Figure 3:
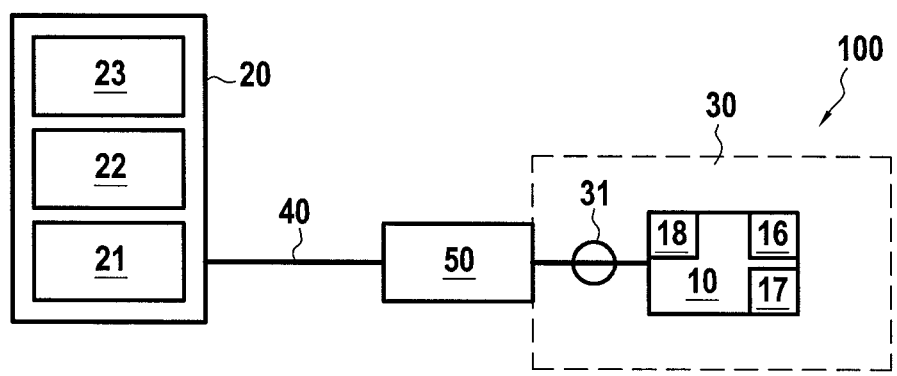
FIG. 3 illustrates a simplified view of an inspection system comprising the mobile robot according to one embodiment.

The aforementioned signals and possibly additional control, measurement or power supply signals, can be conveyed from an outer monitoring unit 20 illustrated in FIG. 3. This figure represents a system for inspecting 100 an engine 30 using the mobile robot 10. The mobile robot has here been inserted into the engine 30 via an endoscopic hole 31. In the example illustrated, a wired connection 40 passing through the endoscopic hole 31 interconnects the mobile robot 10 and the monitoring unit 20.

The monitoring unit 20 comprises a control module 21 configured to control the movement of the mobile robot 10 according to the three spatial dimensions, via a control of its motorized wheels 13, and its hinge via a command for tensioning the ball joints. 12. The signals associated with these commands can be transmitted via the wired connection 40. These control signals result from the interactions of an operator with a man-machine interface 23 constituting the monitoring unit 20, in order to drive the mobile robot 10 and according to its position in the engine 30. The position of the mobile robot 10 in the engine 30 can be evaluated from an on-board guide system 17, for example using an inertial unit integrated into the hollow rigid segments 11. Based on the position, speed and acceleration information of the robot, on the torque measured on each motorized wheel 13 and on the measurements of the measuring device(s) 14, an algorithm integrated into the monitoring unit 20 then allows ensuring the correct movement of the robot in line with the request of the operator. The monitoring unit 20 can also control the activation of a light source 18 integrated into the mobile robot 10 or transmit, by an optical fiber constituting the wired connection 40, a light source coming from the monitoring unit 20.

The monitoring unit 20 further comprises a receiving module 22 configured to receive the measurements from the measuring device(s) 14 via the wired connection 40, for example via an optical fiber. The results of these measurements (e.g. data, images) and the location information of the mobile robot 10 can be displayed live on a screen associated with the man-machine interface 23, in order to allow the operator to drive the robot and monitor the data (e.g. location of the robot, quality of the data obtained, consideration of obstacles visible in the images reversed by a camera).

A motorized unwinder 50 is also positioned on the engine 30 and is configured to unwind (or wind) the wired connection 40 based on the control signals coming from the control module 21 of the monitoring unit 20. The unwinder 50 is an unwinder with slack management, that is to say it monitors the slack of the wired connection 40. This slack management can for example be achieved by a slack limiter (not illustrated) integrated into the monitoring unit and configured to activate selectively in order to provide, during selected time periods, slack to the wired connection 40. The wired connection 40 interconnecting the mobile robot 10 and the monitoring unit 20, the management of the slack of the wired connection 40 advantageously allows accurate movement of the mobile robot 10 while limiting the tensile stresses that the wired connection 40 would be likely to exert thereon. Any tensile stress on the wired connection 40 that could impact the movement of the mobile robot 10 is thus eliminated, both during the unwinding and during the winding of the wired connection 40.

The wired connection 40 can also, if necessary, provide a power supply signal to the mobile robot 20. A wired connection is here described for the transmission of the control and measurement signals between the monitoring unit 20 and the mobile robot 10, but of course a wireless connection fulfilling the same functions could be used, in particular if the mobile robot 10 has an on-board power supply source. In the latter case, the use of an unwinder 50 is not necessary.

Figure 4:
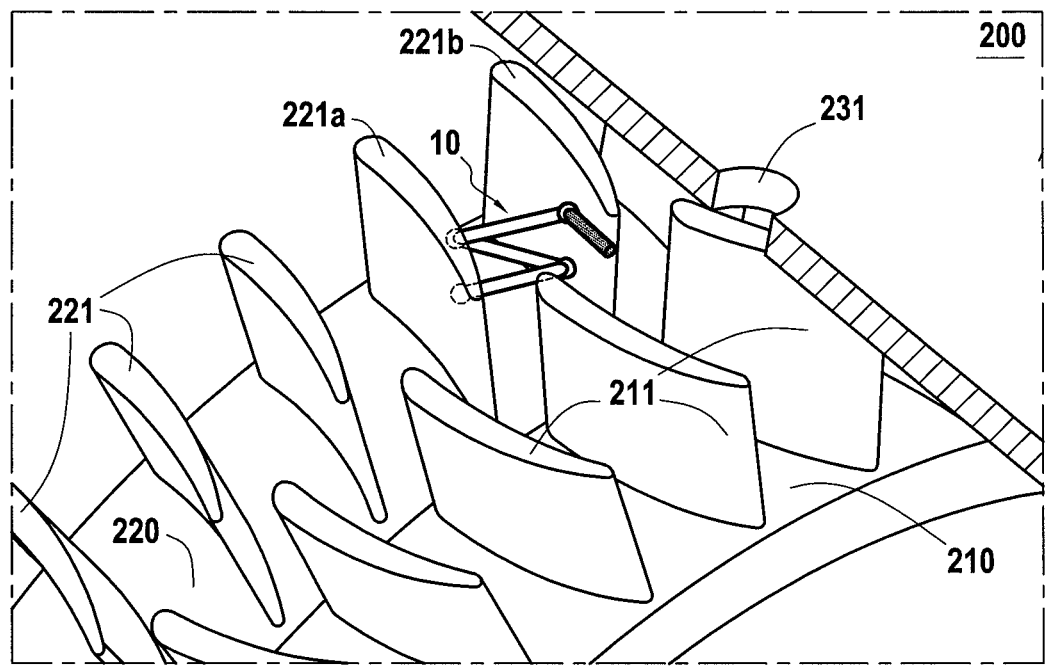
FIG. 4 illustrates a partial view of a rotor and stator stage of a turbomachine inspected by the mobile robot according to one embodiment.
Figure 5:
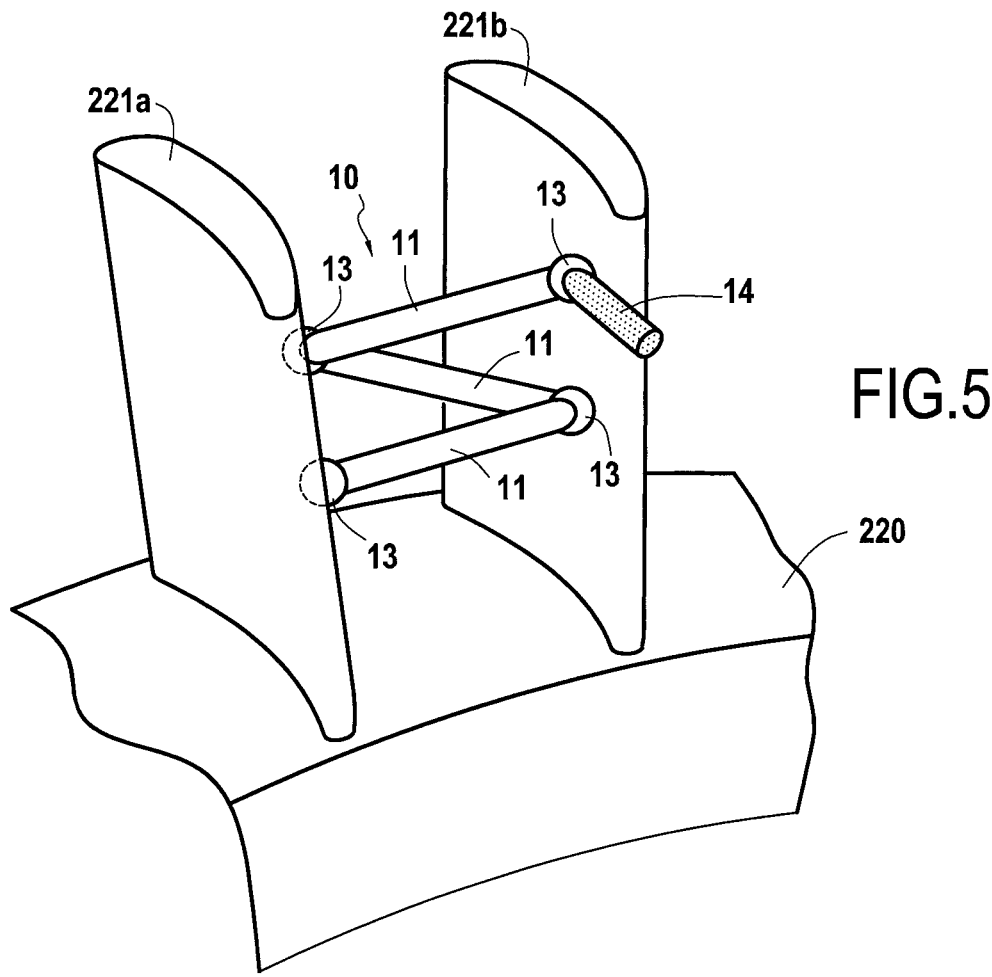
FIG. 5 illustrates an enlargement of two blades of FIG. 4 between which the mobile robot is disposed.

FIGS. 4 and 5 illustrate an example of application of the mobile robot 10, used here for the inspection of the vanes 211 constituting a rotor stage 210, and/or the vanes 221 constituting a stator stage 220 of an aircraft turbomachine 200. The inspection method is as follows.

First, the operator controls via the monitoring unit 20 the mobile robot 10 in the first configuration (see FIG. 1), that is to say in a rectilinear configuration. This first configuration allows the operator to easily insert the mobile robot 10 into an endoscopic hole 231 arranged in the turbomachine 200. If the mobile robot is interconnected via a wired connection 40 to a monitoring unit 20, part of the wired connection 40 is also inserted into the endoscopic hole 231.

The mobile robot 10 is then positioned between two blades, here two blades 221*a*, 221*b* of the stator stage 220. The mobile robot 10 is then controlled to be tensioned via its ball joints 12 in the second configuration. As explained above, in this second configuration, the tensioning system 16 controls the elastic tensioning of the ball joints 12 by allowing the application of an elastic restoring force. FIG. 5 illustrates an enlargement of the blades 221*a*, 221*b* of the stator 220 of FIG. 4. As can be seen in this figure, the ball joints 12 exert in the second configuration a restoring force leading to a hinge of the rigid segments 11, thus conferring flexibility to the mobile robot 10. Under the effect of the restoring force of the ball joints 12, the motorized wheels 13 then bear between a first surface of the blade 221*a* and a second surface of the blade 221*b*, for example between an extrados surface and an intrados surface of these blades. The frictional force exerted by the motorized wheels 13 on the surfaces of the blades 221*a*, 221*b* then allows holding the mobile robot 10 therebetween, and guarantees the adhesion of the robot to the blades during its movements according to the three spatial dimensions. In order to allow the insertion of the mobile robot between the blades 10, the lengths of the rigid segments 11 are previously chosen so as to be smaller than the height of the blades 221*a*, 221*b*, and the diameters of the motorized wheels 13 and of the rigid segments 11 are chosen so as to be smaller than the spacing between the blades 221*a*, 221*b*. For example, the rigid segments 11 may have a diameter less than 1 cm and the motorized wheels 13 a diameter less than 1 cm. Given its compactness, the mobile robot 10 is able to circulate between two successive stator and rotor stages, for example by bearing between the surfaces of two consecutive blades.

In order to inspect the blades 211 of the rotor stage 210, the rotors of the turbomachine 200 are then rotated through 360°, and the measuring device 14 inspects (e.g.: taking images, measurements) the blades 211 facing the stator 220 during this rotating step. All the blades 211 of the rotor 210 are thus inspected according to the same image pickup. Likewise, in order to inspect all the blades 221 of the stator stage 220, the operator can drive the movement of the mobile robot 10, which still remains in the second configuration, such that the mobile wheels 13 bear between two blades 211 of the rotor 210. The rotors of the turbomachine 200 are then rotated through 360° and the measuring device 14 inspects during this step the blades 221 of the stator 220 facing the rotor 10. Furthermore, during the rotation of the stator 220 and in case of use of a wired connection 40 (not present in the example illustrated), the monitoring unit 20 controls the unwinder 50 so as to unwind the connection in line with the rotation of the turbomachine 200, thus preventing any possible risk of motion of the mobile robot 10 and/or of jamming of the wired connection 40. The control of unwinding or winding of the wired connection 40 also comprises, as explained above, the management of its slack in order to prevent any tensile stress which might impact the movement of the mobile robot 10. The friction of the motorized wheels 13 on the surfaces of the blades also remains sufficient during the rotation of the rotors of the turbomachine to hold in place the robot between two blades. Furthermore, thanks to the guide system 17, the monitoring unit 20 can know at any time the position of the mobile robot 10 and can, depending on this position, authorize or prohibit the rotation of the rotors of the turbomachine 200 in order to prevent any improper handling by the operator. The possible risk of breakage of the mobile robot 10 is thus minimized.

The inspection operations described above can be repeated for each rotor and/or stator stage of the turbomachine 200. Once the inspection operations are complete, the rewinding of the wired connection 40 around the unwinder 50 is controlled by the monitoring unit 20. The mobile robot 10 is then again controlled by the operator in the first configuration, the elastic tensioning of the ball joints 12 then being deactivated following this request. Thus, the mobile robot 10 takes a rectilinear shape and the operator extracts it via the endoscopic hole 231. The implementation of a wired connection 40 can also here constitute additional safety in case of possible failure of the mobile robot 10, the robot then being extractable by simple mechanical traction of the wired connection 40.

Advantageously, the mobile robot 10 described above has miniaturized dimensions and a low mass. It can thus be easily inserted into endoscopic holes 31 of an engine 30, move between two blades of a rotor or stator stage via its motorized wheels 13, move from one stage to another, be located in the engine 30 thanks to its on-board guide system 17, lights up the areas to be inspected, acquire and transmit measurements and/or image pickups from the interior of the engine 30 via the measuring device(s) 14. While the inspection tools of the state of the art are difficult to insert into narrow spacings and often have to bypass them in order to avoid bumping into walls, the mobile robot 10 described above takes advantage of the narrow spacing between two surfaces, for example of an inter-blade spacing, so as to move by adhesion via its motorized wheels 13. Advantageously, the low mass of the mobile robot 10 as well as the frictional forces of the motorized wheels 13 then allow said robot not to move despite the rotation of a rotor. The interior of an engine commonly includes blades that have large radii of curvature and twists. The mobile robot 10 described above advantageously allows, via tensioning the ball joints 12, adapting to the environment encountered without affecting its mobility. Finally, thanks to the guide system 17 of the mobile robot 10, the holding of the mobile robot 10 between two surfaces allows obtaining localized measurements which are easily repeatable by the operator. The operator will thus be able, during future inspections, to position the mobile robot 10 under the same conditions as during previous inspections. The data obtained are therefore highly reusable, in particular for their use in statistical/physical models for the diagnosis of the engines. The mobile robot 10 described above therefore ensures good complementarity and interoperability with respect to the existing diagnostic tools.

The invention claimed is:

1. A mobile robot for inspecting a turbomachine comprising:
    at least one measuring device;
    and a body including an assembly of at least three rigid segments each having two opposite longitudinal ends, characterized in that the longitudinal ends of each segment are equipped with a hinge including a ball joint, each ball joint comprising a motorized wheel mounted thereon and therearound, the at least one measuring device being mounted on a ball joint located at a longitudinal end of the body, wherein the mobile robot further includes a tensioning system for tensioning the ball joints, wherein the tensioning system is configured to tension the ball joints by moving the segments and said at least one measuring device between a first configuration in which the segments and the at least one measuring device are aligned and a second configuration in which each segment has with said at least one adjacent segment or with said at least one measuring device an angle less than 180° by winding an elastic cable or by use of a shape memory spring.

2. The mobile inspection robot according to claim 1, wherein the longitudinal ends of each segment have a bevel-shaped profile.

3. The mobile inspection robot according to claim 1, wherein said at least one measuring device comprises at least a camera, a laser probe and/or an ultrasound probe.

4. The mobile inspection robot according to claim 1, wherein one of the at least one measuring device is located at a longitudinal end of the body and another one of the at least one measuring device is located at an opposite longitudinal end of the body.

5. The mobile inspection robot according to claim 1, wherein the motorized wheels are universal wheels or Mecanum wheels.

6. The mobile inspection robot according to claim 1, wherein said at least one measuring device has dimensions smaller than the length of each segment.

7. An inspection system comprising a mobile inspection robot according to claim 1, the system further comprising:
    a monitoring unit comprising a control module configured to control the movement and the hinge of the mobile robot according to the three spatial dimensions; and
    a receiving module configured to receive measurements obtained from said at least one measuring device.

8. The inspection system according to claim 7, comprising:
    a wired connection interconnecting the mobile robot and the monitoring unit, the wired connection being configured to convey a control signal of the mobile robot coming from the control module to the mobile robot and to convey a measurement signal from said at least one measuring device to the receiving module, and
    an unwinder with slack management configured to unwind the wired connection according to a control signal of the monitoring unit.

9. A method for inspecting a turbomachine implementing an inspection system according to claim 7, the method comprising the following steps:
- a step of inserting the mobile robot into an endoscopic hole arranged in the turbomachine;
- a step of positioning the mobile robot between two blades of a rotor or stator stage of the turbomachine;
- a step of tensioning the mobile robot;
- a step of rotating the rotors of the turbomachine; and
- a step of inspecting, by said at least one measuring device, the blades facing the mobile robot during the rotating step.

10. An inspection system comprising:
a mobile inspection robot for inspecting a turbomachine, the mobile inspection robot comprising:
- at least one measuring device; and
- a body including an assembly of at least three rigid segments each having two opposite longitudinal ends,
- characterized in that the longitudinal ends of each segment are equipped with a hinge including a ball joint, each ball joint comprising a motorized wheel mounted thereon and therearound, the at least one measuring device being mounted on a ball joint located at a longitudinal end of the body,
wherein the system further comprises:
- a monitoring unit comprising a control module configured to control the movement and the hinge of the mobile robot according to the three spatial dimensions;
- a receiving module configured to receive measurements obtained from said at least one measuring device;
- a wired connection interconnecting the mobile robot and the monitoring unit, the wired connection being configured to convey a control signal of the mobile robot coming from the control module to the mobile robot and to convey a measurement signal from said at least one measuring device to the receiving module; and
- an unwinder with slack management configured to unwind the wired connection according to a control signal of the monitoring unit.

11. A method for inspecting a turbomachine implementing an inspection system, wherein the inspection system includes:
a mobile inspection robot for inspecting a turbomachine, the mobile inspection robot comprising:
- at least one measuring device; and
- a body including an assembly of at least three rigid segments each having two opposite longitudinal ends,
- characterized in that the longitudinal ends of each segment are equipped with a hinge including a ball joint, each ball joint comprising a motorized wheel mounted thereon and therearound, the at least one measuring device being mounted on a ball joint located at a longitudinal end of the body,
wherein the inspection system further includes:
- a monitoring unit comprising a control module configured to control the movement and the hinge of the mobile robot according to the three spatial dimensions;
- a receiving module configured to receive measurements obtained from said at least one measuring device;
- a wired connection interconnecting the mobile robot and the monitoring unit, the wired connection being configured to convey a control signal of the mobile robot coming from the control module to the mobile robot and to convey a measurement signal from said at least one measuring device to the receiving module; and
- an unwinder with slack management configured to unwind the wired connection according to a control signal of the monitoring unit,
wherein the method comprises:
- a step of inserting the mobile robot into an endoscopic hole arranged in the turbomachine;
- a step of positioning the mobile robot between two blades of a rotor or stator stage of the turbomachine;
- a step of tensioning the mobile robot;
- a step of rotating the rotors of the turbomachine; and
- a step of inspecting, by said at least one measuring device, the blades facing the mobile robot during the rotating step.

\* \* \* \* \*